United States Patent [19]

Vogel

[11] Patent Number: 5,795,161
[45] Date of Patent: Aug. 18, 1998

[54] APPARATUS AND METHOD FOR CALCULATING AN ABSOLUTE TIME AT WHICH AN EVENT OCCURRED

[76] Inventor: Peter S. Vogel, 28 Adeline Street, Faulconbridge NSW 2776, Australia

[21] Appl. No.: 484,898

[22] Filed: Jun. 7, 1995

Related U.S. Application Data

[63] Continuation-in-part of Ser. No. 684,894, May 29, 1992, Pat. No. 5,453,015.

[30] Foreign Application Priority Data

Oct. 20, 1988 [AU] Australia .................... PJ1083
Oct. 20, 1989 [WO] WIPO ............. PCT/AU89/00457

[51] Int. Cl.[6] .................................................... G09B 3/00
[52] U.S. Cl. ...................... 434/350; 434/118; 434/323
[58] Field of Search .................... 434/118, 169, 434/185, 322, 323, 324, 350, 362, 307 R; 379/96, 105; 364/419.2; 371/33, 62; 370/313, 349; 340/825.44, 825.06, 825.07; 455/2, 38.1; 368/46, 108, 119; 377/20; 395/927, 761

[56] References Cited

U.S. PATENT DOCUMENTS

| | | |
|---|---|---|
| 3,718,759 | 2/1973 | Reiffel . |
| 3,771,240 | 11/1973 | Matui . |
| 3,934,226 | 1/1976 | Stone et al. . |
| 4,121,355 | 10/1978 | Kimoto et al. . |
| 4,122,498 | 10/1978 | Dyer . |
| 4,377,870 | 3/1983 | Anderson et al. . |
| 4,518,361 | 5/1985 | Conway . |
| 4,651,299 | 3/1987 | Miyazaki et al. . |
| 4,745,468 | 5/1988 | Von Kohorn . |
| 4,926,255 | 5/1990 | Von Kohorn . |
| 5,033,969 | 7/1991 | Kamimura . |
| 5,176,520 | 1/1993 | Hamilton . |
| 5,211,564 | 5/1993 | Martinez et al. . |
| 5,273,437 | 12/1993 | Caldwell et al. . |
| 5,294,229 | 3/1994 | Hartzell et al. . |

FOREIGN PATENT DOCUMENTS

| | | |
|---|---|---|
| 0010794 | 5/1980 | European Pat. Off. . |
| 59-086341 | 5/1984 | Japan . |
| 2148675 | 5/1985 | United Kingdom . |
| 2184029 | 6/1987 | United Kingdom . |
| 86-02753 | 5/1986 | WIPO . |
| 86-07277 | 12/1986 | WIPO . |
| 90-04439 | 5/1990 | WIPO . |

Primary Examiner—Joe Cheng
Attorney, Agent, or Firm—Cushman Darby & Cushman IP Group of Pillsbury Madison & Sutro LLP

[57] ABSTRACT

An event logging system in which logged events are time stamped by storing a value read from a counter which is incremented at an arbitrary but consistent rate. When the data is recalled for analysis, the actual time of the event is calculated by reading the current value of the counter, reading the stored counter values associated with logged events, measuring the period of the clock incrementing the counter, and then using this information to calculate the absolute time.

2 Claims, 3 Drawing Sheets

APPARATUS AND METHOD FOR CALCULATING AN ABSOLUTE TIME AT WHICH AN EVENT OCCURRED

RELATED APPLICATIONS

This application is a continuation-in-part of U.S. patent application Ser. No. 08/684,894 filed of May 29, 1993, now U.S. Pat. No. 5,453,015.

BACKGROUND OF THE INVENTION

1. Field of the Invention

The present invention relates to methods of, and means for recording and recalling timing information and identifying information related to events.

2. Description of the Related Art

Event logging systems are used to record information over a period of time for retrospective analysis. Such systems comprise some form of memory into which data corresponding to input signals are stored along with information identifying the time of the event. When it is desired to analyze the logged data, the event identifying and timing information is recalled and processed.

An example of such a logging system is a game playing device which records player responses along with the time at which the response was made. Such a device might include three pushbuttons, labelled "A", "B", "C", a clock/calendar device and digital memory arranged so that when one of the buttons is pressed, data identifying which button was pushed as well as the current time/date are stored in memory. This allows the device to be used for playing a quiz game. As the responses to multiple-choice questions are stored along with the time the response was made, the information can subsequently be recalled from memory for score calculation. The timing information is required to ensure that the responses were made during the time window allowed for response, and also for correlating the responses with questions.

In prior art logging systems, timing information is provided by a clock/calendar system typically comprising a stable oscillator driving suitable counting/calculating means. So that the timing information recorded is accurate, the oscillator must be stable and set to the exact frequency required and the time/date must be correctly set before logging begins. Logged information can be incorrectly time-stamped if, for example, the frequency of the oscillator is incorrectly set or the wrong time or date has been set.

SUMMARY OF THE INVENTION

It is an object of the present invention to provide an improved logging system which does not require the time and date to be set in advance of recording data and which can provide correct timing information without needing the oscillator to be set to a particular frequency.

According to a first aspect of the present invention there is provided a method of logging events comprising the steps of receiving a signal marking an event to be logged and storing in memory means a first timer value being the instantaneous value stored in a counter which is incremented at regular intervals. The rate of incrementing of said is counter is arbitrary but consistent, and the absolute value of the counter does not have a particular relationship with the time of day or date. This aspect of the invention also includes the method of recalling the logged information which further comprises the steps of recalling from said memory means said first timer value, receiving from said counter a second timer value representing the count at the moment of recalling said first timer value, subtracting said first timer value from said received second timer value to calculate a third value being the difference in time between the time of the event and the time of recall, receiving a signal oscillating with a period equal to the interval at which said counter is being incremented, measuring the period of said oscillating signal in absolute units to calculate a fourth value being the value of each time interval counted, multiplying the calculated third value by the fourth value to give a relative time value in absolute units, and subtracting said relative time value from the time of day and date at which the recall is performed. The result of this last step is the time and date at which the event occurred.

According to another aspect of the present invention, the method is extended to provide means for logging a number of events by storing multiple counter values in different locations of memory means, each being associated with another event.

A further aspect of the invention extends the inventive concept to provide a method of logging a number of different types of event by storing, for each event logged, data indicative of an event type, as well as the associated counter value.

The invention also consists in means for carrying out the methods disclosed above.

BRIEF DESCRIPTION OF THE DRAWINGS

An embodiment of the invention will now be described with reference to the drawing in which.

DETAILED DESCRIPTION OF THE PRESENTLY PREFERRED EXEMPLARY EMBODIMENT

Figure 1:
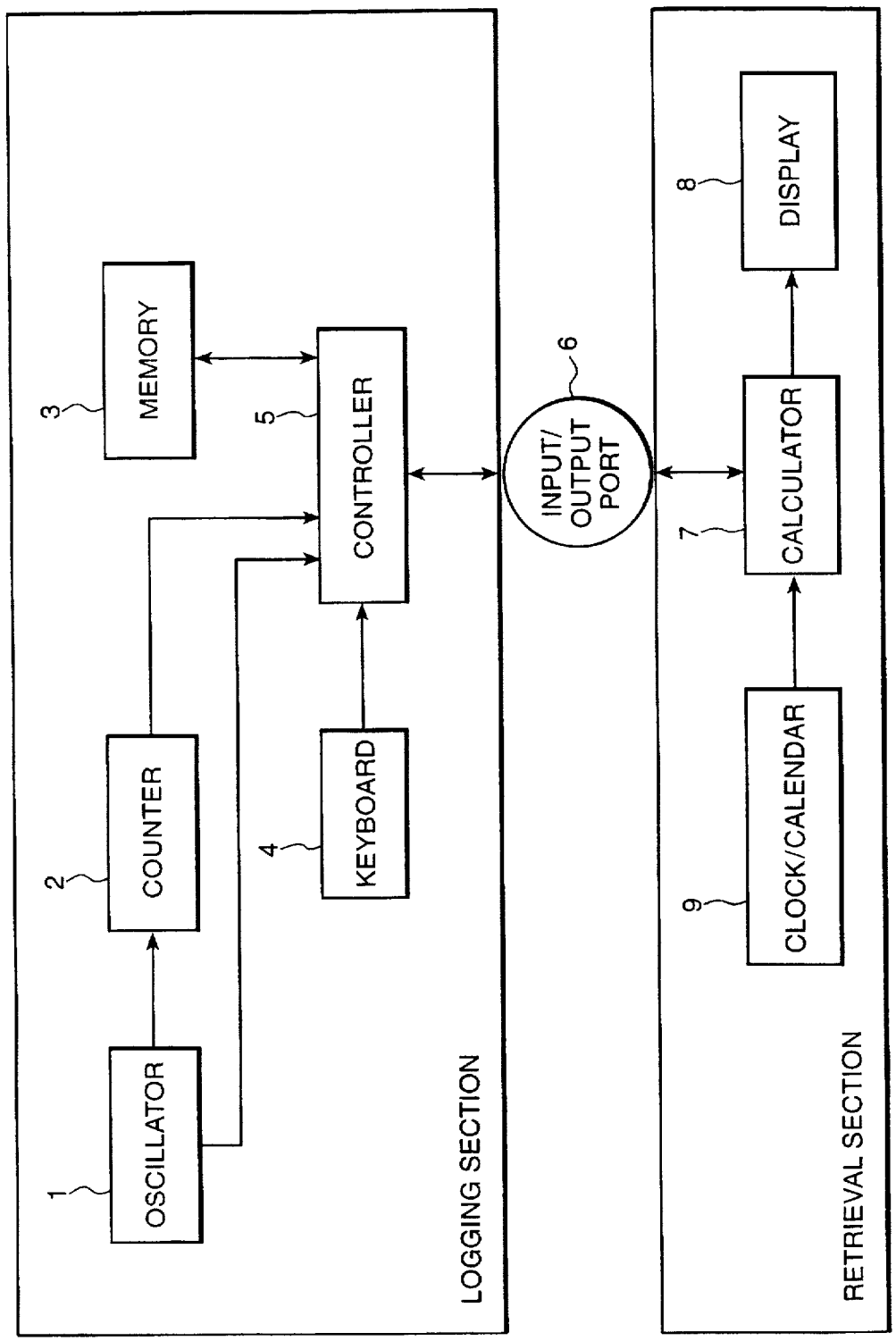
FIG. 1 is a block diagram of an event logger suitable for use in recording and recalling responses to a quiz game.

The embodiment of the present invention illustrated in the FIG. 1 can be used to allow a player to enter responses to multiple-choice questions posed by pressing one of six buttons when a question is asked. Information is stored identifying which button was pressed along with timing information related to the response. The time information can be compared to the time and date at which the corresponding question was asked or broadcast. This enables television audiences, for example, to participate in a quiz show while guarding against cheating or to weight scores according to response time.

Referring to the FIG. 1, the invention comprises two sub-systems which can be disconnected from each other during event logging and connected together when it is desired to retrieve logged information. In practice, a number of devices comprising the logging section can be provided so that many players can play the game at the same time. The logging section can subsequently be connected to the calculating section for data retrieval. The point of disconnection is input/output port 6.

Figure 2:
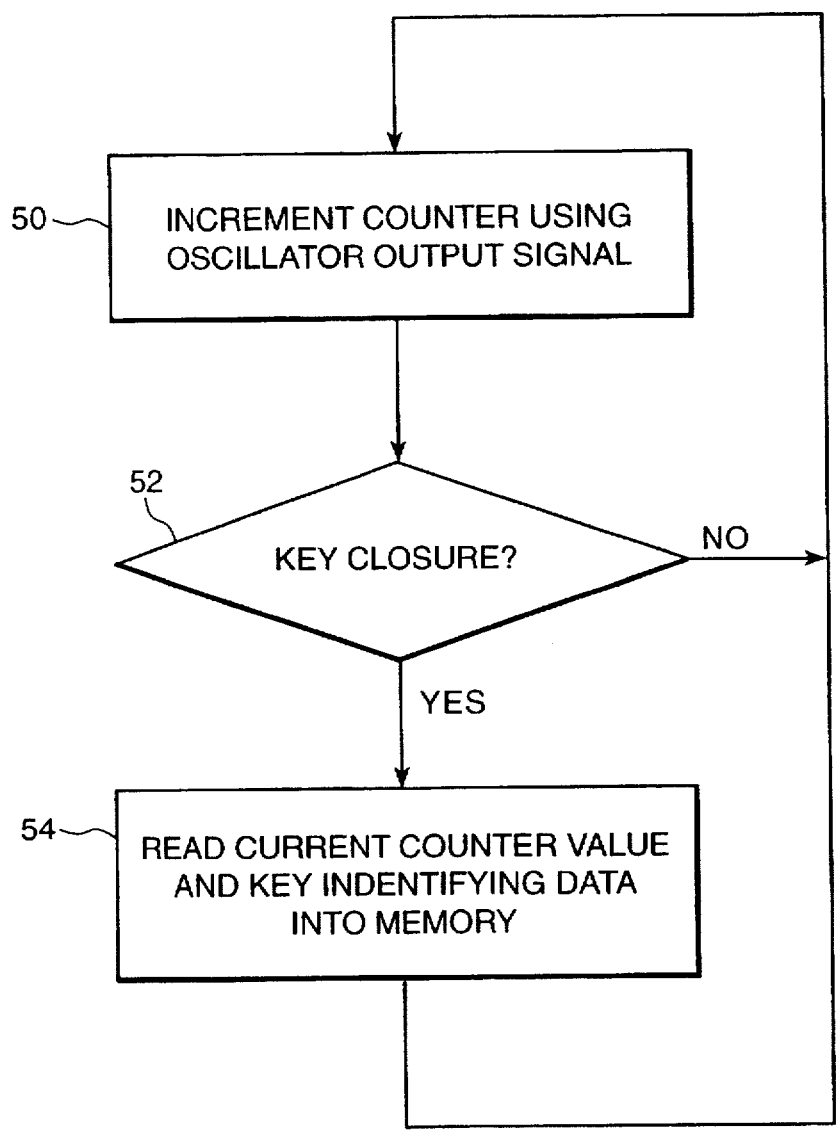
FIG. 2 is a flowchart illustrating the data recording process.

Operation of the logging section of the invention will now be described with reference to FIGS. 1 and 2. Oscillator 1 is a crystal controlled oscillator which runs continuously. The particular frequency of oscillation is not relevant to the operation of the invention, so it is not necessary to adjust the frequency as a manufacturing step. Oscillator 1 of this embodiment also includes a divider chain which reduces the output frequency to approximately 1 Hz. Counter 2 is a 24 bit counter clocked by the output of oscillator 1, so that it counts approximately in seconds. See step 50 in FIG. 2. Counter 2 counts continuously, from the time power is applied. Keyboard 4 accepts input from the player. When a question is asked, the player responds by pressing one of the six keys. Controller 5 senses the key closure (step 52), reads the value of counter 2, and writes it to a location in memory 3, along with further data identifying which key was pressed (step 54). Subsequent key presses cause counter value and key identification data to be written to sequential memory locations.

Figure 3:
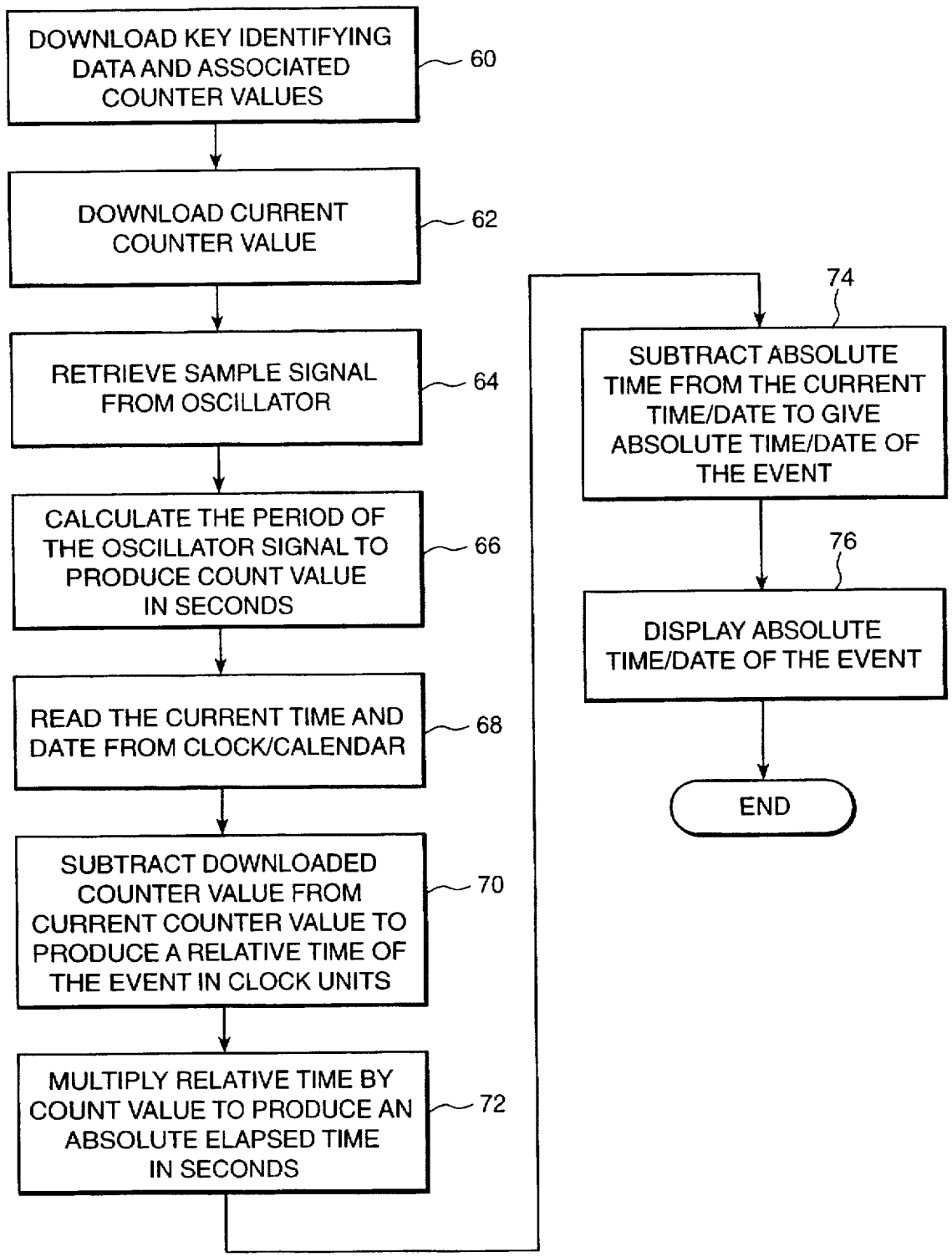
FIG. 3 is a flowchart illustrating the data retrieval process.

Operation of the retrieval section will now be described with reference to FIG. 1 and 3. When the game is complete, the logged information can be retrieved for analysis. First, calculator 7 is connected to controller 5 via input/output port 6. Calculator 7 then sends a signal to controller 5 which causes controller 5 to read the contents of memory 3 and transmit the key identifying data and associated counter values to calculator 7. See step 60 in FIG. 3. Calculator 7 then requests that controller 5 interrogate counter 2 and send the current value to calculator 7. See step 62 in FIG. 3. Calculator 7 then requests that controller 5 send a sample of the output of oscillator 1 to calculator 7. See step 64 in FIG. 3. Calculator 7 then carries out the following calculations:

1. The period of the output of oscillator 1 is calculated to give the value of each count in seconds (step 66);
2. Calculator 7 reads the current time/date from clock/calendar 9 (step 68); and
3. For each event recalled:
   i) the counter value is subtracted from the current counter value received, to yield the relative time of the event (in clock units)(step 70);
   ii) the relative time is multiplied by the value of each count previously calculated to give the absolute elapsed time (in seconds)(step 72); and
   iii) the absolute time is subtracted from the current time/date to give the absolute time and date of the event (step 74).

Calculator 7 then displays, on display 8, a table identifying for each event which key was pressed and the time and date that it was pressed (step 76). This table can then be used to score the game by observing which key was pressed in response to each question asked. The term "score" as used herein refers to the result of comparing a recorded response and a preferred response or any tabulation or statistical analysis of responses.

The foregoing describes only one embodiment of the invention, and modifications obvious to those skilled in the art can be made without departing from the scope of the invention. For example, whereas in the embodiment described the timing means is continuously running, it is envisaged that the timing means could begin running when a first response is sensed, or operate continuously from, for example, the time of sale of the device, or the time of insertion of batteries. The means for recalling stored responses and timing information described in relation to the embodiment above is also only one example of suitable means and method. For example, instead of connecting the logging device to the recalling device by means of an electrical connector, it is envisaged that the information could be transferred by other means, such as an optical or acoustic coupler or by physically transferring a storage medium, such as a solid state device or floppy disk, from the logging device to the recalling/calculating device.

Furthermore, although the embodiment of the invention is described herein as being practiced using discrete electronic elements, a variety of other techniques can be used with good results. For example, the functions required can be economically achieved using a suitably-programmed microprocessor or an application-specific integrated circuit.

What is claimed is:

1. A method of calculating the absolute time at which an event occurred using a calculating device, comprising the steps of:
   i) outputting a signal indicative of a number of elapsed time units by a timer, said number of elapsed time units being incremented based on a periodic signal;
   ii) receiving a first value representing a number of said time units output from said timer at a time at which the event occurred;
   iii) receiving a second value representing a number of said time units output from said timer at a time when a method of calculating a absolute time at which an event occurred is performed;
   iv) subtracting said first value from said second value to give a third value;
   v) receiving said periodic signal representative of a period of said time units; vi) measuring an absolute time period of said periodic signal to determine a clock period of said time units; vii) multiplying said third value by said clock period to determine an absolute elapsed time; and viii) subtracting said absolute elapsed time from a current time to yield an absolute event time.

2. Apparatus for calculating the absolute time at which an event occurred, comprising:
   a timer for outputting a signal indicative of a number of elapsed time units, said number of elapsed time units being incremented based on a periodic signal; and
   a calculator adapted to:
   i) receive a first value representing a number of time units output from said timer at a time at which the event occurred;
   ii) receive a second value representing the number of said time units output from said timer at a time when a calculation to determine an absolute time at which an event occurred is performed;
   iii) subtract said first value from said second value to give a third value;
   iv) receive said periodic signal representative of a period of said time units;
   v) measure an absolute time period of said periodic signal to determine a clock period of said time units;
   vi) multiply said third value by said clock period to determine an absolute elapsed time value; and
   vii) subtract said absolute elapsed time value from a current time to yield an absolute event time.

* * * * *